US010686746B2

(12) United States Patent
Bastide et al.

(10) Patent No.: US 10,686,746 B2
(45) Date of Patent: Jun. 16, 2020

(54) MAINTAINING RELATIONSHIPS BETWEEN USERS IN A SOCIAL NETWORK BY EMPHASIZING A POST FROM A FIRST USER IN A SECOND USER'S ACTIVITY STREAM BASED ON DETECTED INACTIVITY BETWEEN USERS

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 15/147,529

(22) Filed: May 5, 2016

(65) Prior Publication Data
US 2017/0324697 A1 Nov. 9, 2017

(51) Int. Cl.
*H04L 12/58* (2006.01)
*H04L 29/06* (2006.01)

(52) U.S. Cl.
CPC .............. *H04L 51/32* (2013.01); *H04L 51/24* (2013.01)

(58) Field of Classification Search
CPC .... G06Q 10/1095; G06Q 50/01; G06Q 10/10; G06Q 30/0256; H04L 51/24; H04L 12/1895; H04L 67/26; H04L 67/22; H04L 51/046; H04L 51/16; H04L 51/36; H04L 67/306; H04L 51/32; H04L 51/22; H04L 61/1594; H04L 51/18; H04L 51/28; (Continued)

(56) References Cited

U.S. PATENT DOCUMENTS 7,366,759 B2 4/2008 Trevithick et al.
7,921,174 B1 * 4/2011 Denise ................. G06Q 10/107
709/206

(Continued)

OTHER PUBLICATIONS

Belle Cooper; 10 Realistic Ways to Keep Your Overflowing Inbox Under Control, Jun. 26, 2014 (Year: 2014).*

(Continued)

*Primary Examiner* — Tonia L Dollinger
*Assistant Examiner* — Linh T. Nguyen
(74) *Attorney, Agent, or Firm* — Robert A. Voigt, Jr.; Winstead PC

(57) ABSTRACT

A method, system and computer program product for maintaining relationships between users in a social network. Online interactions between users in the social network are monitored. A period of inactivity of communication from a first user to a second user in the social network is determined based on the time of the last communication from the first user to the second user. If the period of inactivity exceeds a threshold, then a communication posted by the second user in the social network is selected, such as based on popularity. The selected communication posted by the second user is then emphasized in an activity stream (e.g., news feed) of the first user. In this manner, by emphasizing a communication posted by the second user in an activity stream of the first user, the relationship between the first and second users may continue to be active.

20 Claims, 3 Drawing Sheets

(58) Field of Classification Search
CPC ... H04L 51/34; H04L 41/0686; G06F 16/951; G06F 16/24578; G06F 17/28; G06F 16/248; G06F 16/245; G06F 16/285; G06F 11/3065; G06F 16/2365; G06F 16/90328; H04W 4/12; H04W 4/21; H04M 15/83
USPC .................................................. 709/206, 207
See application file for complete search history.

(56) References Cited

U.S. PATENT DOCUMENTS

| | | | |
|---|---|---|---|
| 8,307,066 | B2 | 11/2012 | Carter et al. |
| 8,903,927 | B2 | 12/2014 | Chen et al. |
| 9,032,306 | B2 | 5/2015 | Wang et al. |
| 9,059,882 | B2 | 6/2015 | Tsukidate |
| 9,098,176 | B1 | 8/2015 | Tauber et al. |
| 9,117,199 | B2* | 8/2015 | Peters ............... G06Q 10/101 |
| 9,614,804 | B2* | 4/2017 | Myles ................. H04L 51/22 |
| 2007/0124672 | A1* | 5/2007 | Cragun ............... G06F 17/00 715/234 |
| 2009/0106365 | A1* | 4/2009 | Drory ................. G06Q 10/107 709/206 |
| 2009/0138828 | A1* | 5/2009 | Schultz ............... G06Q 10/10 715/853 |
| 2010/0287033 | A1* | 11/2010 | Mathur ................ G06Q 50/01 705/319 |
| 2011/0185285 | A1* | 7/2011 | Augustine ............ G06Q 10/10 715/751 |
| 2011/0246907 | A1 | 10/2011 | Wang et al. |
| 2011/0320543 | A1* | 11/2011 | Bendel et al. ......... G06F 15/16 709/206 |
| 2012/0166179 | A1 | 6/2012 | Tirumalachetty et al. |
| 2012/0331053 | A1 | 12/2012 | Dunn |
| 2013/0130641 | A1* | 5/2013 | Gudlavenkatasiva .. H04W 4/21 455/405 |
| 2013/0198652 | A1* | 8/2013 | Dunn et al. ............ H04L 43/16 |
| 2013/0212173 | A1 | 8/2013 | Carthcart et al. |
| 2013/0311470 | A1 | 11/2013 | Lotfi |
| 2014/0012769 | A1* | 1/2014 | Wang ................. G06Q 30/0224 705/319 |
| 2014/0089403 | A1 | 3/2014 | Gross et al. |
| 2014/0200974 | A1* | 7/2014 | Morin ................ G06Q 30/0217 705/14.19 |
| 2014/0273977 | A1* | 9/2014 | Colletti ............. H04M 1/72547 455/412.2 |
| 2014/0351719 | A1* | 11/2014 | Cattermole ........... H04L 65/403 715/753 |
| 2015/0019588 | A1 | 1/2015 | Yang et al. |
| 2015/0058417 | A1 | 2/2015 | McConnell et al. |
| 2015/0163189 | A1* | 6/2015 | Proctor et al. .......... H04L 12/58 715/753 |
| 2015/0193684 | A1 | 7/2015 | Li et al. |
| 2015/0234939 | A1* | 8/2015 | Aharony et al. ........ G06F 17/30 707/737 |
| 2015/0242424 | A1 | 8/2015 | Godsey et al. |
| 2015/0312293 | A1* | 10/2015 | Rekhi ................... H04L 65/403 |
| 2015/0356180 | A1 | 12/2015 | Filiz |
| 2015/0356449 | A1 | 12/2015 | Vainstein et al. |
| 2016/0248865 | A1* | 8/2016 | Dotan-Cohen et al. ..................... H04L 29/08 |
| 2017/0213194 | A1* | 7/2017 | Wollmershauser .......................... G06Q 10/1095 |

OTHER PUBLICATIONS

Steve Johnson et al.; Formatting Text for Emphasis; May 1, 2013 (Year: 2013).*
Justin Lafferty; Facebook Announces Story Bumbing, and Other Small Changes to News Feed Algorithm; Aug. 6, 2013 (Year: 2013).*
Yoah Vilner; 5 Tools to Help You Discover Great Content to Share with Your Fans; Aug. 27, 2014 (Year: 2014).*
Spina et al.; Learning Similarity Functions for Detection in Online Reputation Monitoring; Jul. 6-11, 2014 (Year: 2014).*
Al-Quireshi; Online Social Network Management System: State of the Art; 2015; Procedia Computer Science; vol. 73; pp. 474-481 (Year: 2015).*
Lim et al., "Reviving Dormant Ties in an Online Social Network Experiment," Proceedings of the Seventh International AAAI Conference on Weblogs and Social Media, Jun. 28, 2013, pp. 361-369.
Anonymously, "A Method of a Relationship Management in Real Time Collaborative Communication," IP.com, IPCOM000217971D, May 14, 2012, pp. 1-7.

* cited by examiner

MAINTAINING RELATIONSHIPS BETWEEN USERS IN A SOCIAL NETWORK BY EMPHASIZING A POST FROM A FIRST USER IN A SECOND USER'S ACTIVITY STREAM BASED ON DETECTED INACTIVITY BETWEEN USERS

TECHNICAL FIELD

The present invention relates generally to social network services, and more particularly to maintaining relationships between users in a social network by emphasizing a post from a first user in a second user's activity stream based on the detected inactivity between the second user and the first user.

BACKGROUND

A social network service is an online service, platform or site that focuses on building social networks or social relations among people (e.g., those who share interests and/or activities). A social network service essentially consists of a representation of each user (often a profile), his/her social links, and a variety of additional services. Most social network services are web-based and provide means for users to interact over the Internet, such as by e-mail and instant messaging. Social networking sites allow users to share ideas, activities, events, and interests within their individual networks.

Social networking sites (e.g., Facebook®) present to a particular user the posts and stories by other users in a social networking feed or activity stream (may be referred to as a "news feed"). New postings or updates from friends and pages followed by the user (including photo tags, event updates, group memberships and other activity) will be reflected in the user's activity stream.

Currently, users are overwhelmed with postings or updates, and, as a result, may inadvertently miss a posting from a friend, especially infrequent posts from a friend. As a result, a period of time may elapse from the time when the user last communicated with his/her friend thereby possibly causing the relationship to be less "active" in the sense that there will be less communication between the two users.

Unfortunately, there is not currently a means for ensuring that relationships between users in a social network continue to be active relationships.

SUMMARY

In one embodiment of the present invention, a method for maintaining relationships between users in a social network comprises monitoring online interactions between the users in the social network. The method further comprises determining a time of a last communication from a first user to a second user in the social network from the monitored online interactions. The method additionally comprises determining, by a processor of a social network management system, a period of inactivity of communication from the first user to the second user in the social network based on the determined time of the last communication from the first user to the second user. Furthermore, the method comprises selecting, by the processor of the social network management system, a communication posted by the second user in the social network in response to the period of inactivity of communication from the first user to the second user in the social network exceeding a threshold. Additionally, the method comprises emphasizing, by the processor of the social network management system, the selected communication posted by the second user above other communications in an activity stream of the first user.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for maintaining relationships between users in a social network. In one embodiment of the present invention, online interactions between users in a social network are monitored. Online interactions include any communications among the users of a social network. "Communications," as used herein, refer to the exchange of digital messages in any form, including, but not limited to, posts, e-mails, instant messages, etc. The time of the last communication from a first user to a second user in the social network is determined from the monitored online interactions. A period of inactivity of communication from the first user to the second user in the social network is determined based on the time of the last communication from the first user to the second user. If the period of inactivity exceeds a threshold, then a communication posted by the second user in the social network is selected. The communication may be selected based on one or more of the following: popularity, time of last update, randomly selected and content of the selected communication matching content of a prior communication from the first user to the second user within a threshold degree of closeness. The selected communication posted by the second user is emphasized in an activity stream (e.g., news feed) of the first user. In this manner, by emphasizing a communication posted by the second user in an activity stream (e.g., news feed) of the first user, the relationship between the first and second users may continue to be active.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
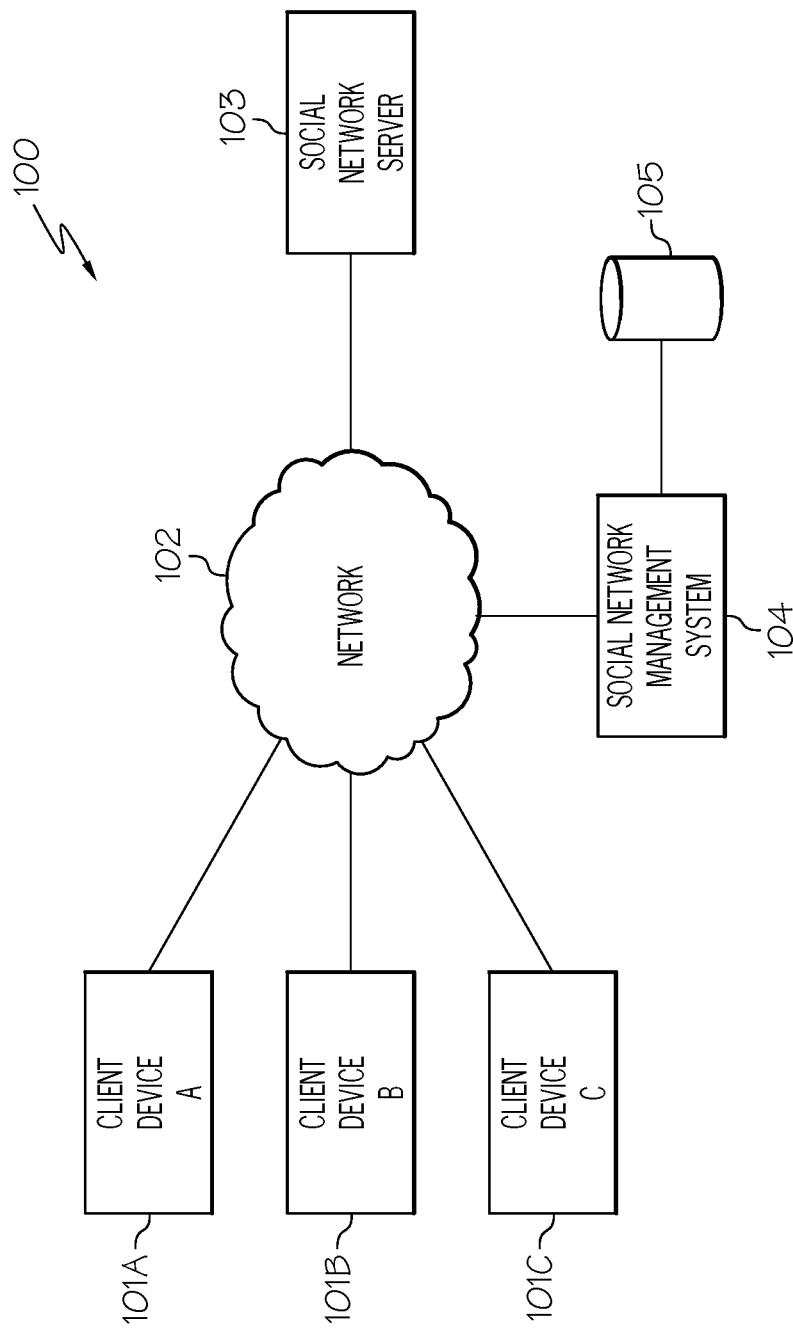
FIG. 1 illustrates a social network system configured in accordance with an embodiment of the present invention.

Referring now to the Figures in detail, FIG. 1 illustrates a social network system 100 configured in accordance with an embodiment of the present invention. Referring to FIG. 1, social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like. It is noted that both client devices 101 and the users of client devices 101 may be identified with element number 101.

Client devices 101 may be configured to send and receive text-based messages in real-time during an instant messaging session. Any user of client devices 101 may be the creator or initiator of an instant message (message in instant messaging) and any user of client devices 101 may be a recipient of an instant message. Furthermore, any user of client devices 101 may be able to create, receive and send e-mails. Additionally, any user of client devices 101 may be able to send and receive text messages, such as Short Message Services (SMS) messages.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts, e-mails, instant messages, etc. "Posts," as used herein, include any one or more of the following: text (e.g., messages, comments, sub-comments and replies), audio, video images, etc. Social network server 103 is connected to network 102 by wire or wirelessly. While FIG. 1 illustrates a single social network server 103, it is noted for clarity that multiple servers may be used to implement the social networking and/or microblogging service.

System 100 further includes what is referred to herein as the "social network management system" 104 connected to network 102 by wire or wirelessly. Social network management system 104 is configured to maintain the relationship between the users of client devices 101 in a social network by emphasizing a recent communication from a second user 101 (e.g., user of client device 101B) in a first user's 101 (e.g., user of client device 101A) activity stream based on the detected inactivity between the first and second users 101 as discussed further below. In one embodiment, the period of inactivity is based on "communications" monitored by social network management system 104, which may be stored in a database 105 connected to social network management system 104. Communications, as used herein, refer to the exchange of digital messages in any form, including, but not limited to, posts, e-mails, instant messages, etc. A description of the hardware configuration of social network management system 104 is provided below in connection with FIG. 2.

System 100 is not to be limited in scope to any one particular network architecture. System 100 may include any number of client devices 101, networks 102, social network servers 103, social network management systems 104 and databases 105. Furthermore, in one embodiment, social network management system 104 may be part of client device 101 or social network server 103.

Figure 2:
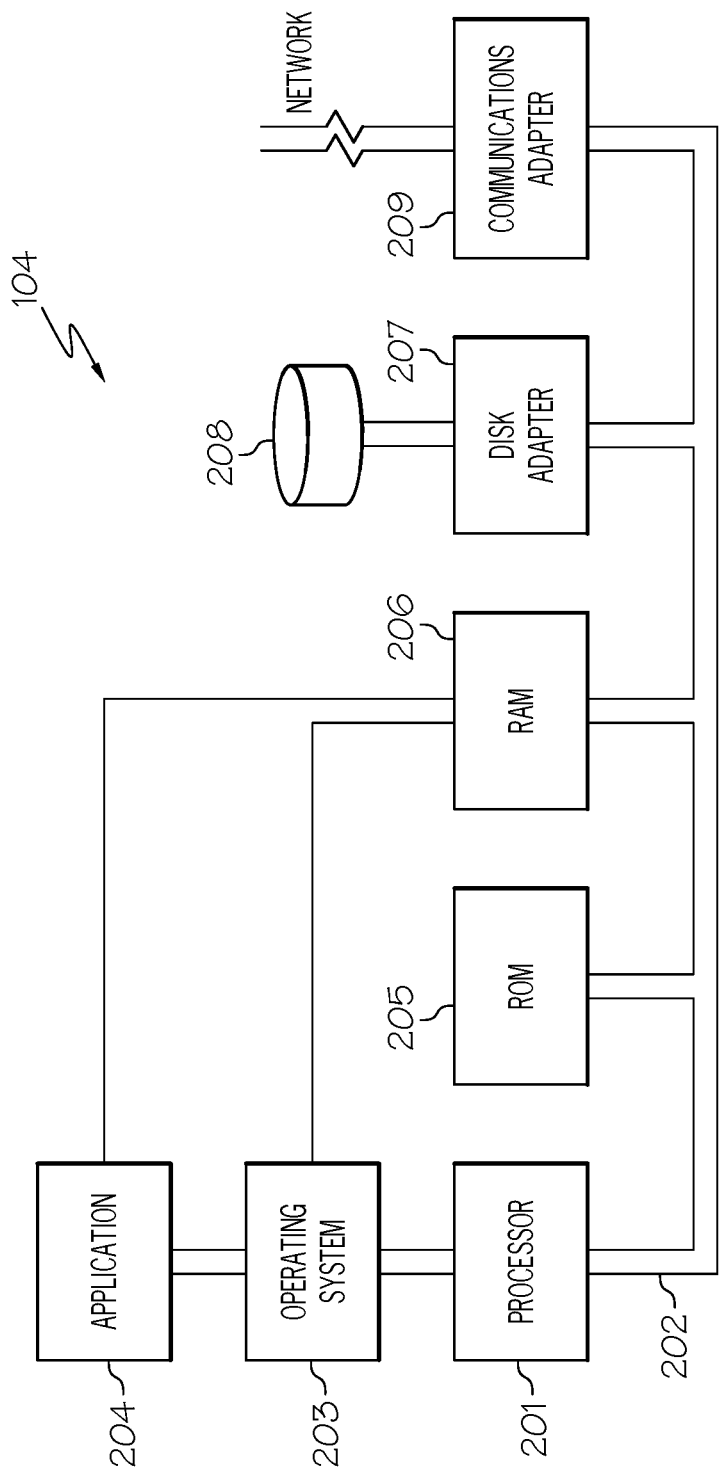
FIG. 2 illustrates a hardware configuration of a social network management system configured in accordance with an embodiment of the present invention.

Referring now to FIG. 2, FIG. 2 illustrates a hardware configuration of social network management system 104 (FIG. 1), which is representative of a hardware environment for practicing the present invention. Referring to FIG. 2, social network management system 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for maintaining relationships between users 101 in a social network as discussed further below in association with FIG. 3.

Referring again to FIG. 2, read-only memory ("ROM") 205 is coupled to system bus 202 and includes a basic input/output system ("BIOS") that controls certain basic functions of social network management system 104. Random access memory ("RAM") 206 and disk adapter 207 are also coupled to system bus 202. It should be noted that software components including operating system 203 and application 204 may be loaded into RAM 206, which may be social network management system's 104 main memory for execution. Disk adapter 207 may be an integrated drive electronics ("IDE") adapter that communicates with a disk unit 208, e.g., disk drive. It is noted that the program for maintaining relationships between users 101 in a social network, as discussed further below in association with FIG. 3, may reside in disk unit 208 or in application 204.

Social network management system 104 may further include a communications adapter 209 coupled to bus 202. Communications adapter 209 interconnects bus 202 with an outside network (e.g., network 102 of FIG. 1) thereby allowing social network management system 104 to communicate with client devices 101 and social network server 103.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, social networking sites (e.g., Facebook®) present to a particular user the posts and stories by other users in a social networking feed or activity stream (may be referred to as a "news feed"). New postings or updates from friends and pages followed by the user (including photo tags, event updates, group memberships and other activity) will be reflected in the user's activity stream. Currently, users are overwhelmed with postings or updates, and, as a result, may inadvertently miss a posting from a friend, especially infrequent posts from a friend. As a result, a period of time may elapse from the time when the user last communicated with his/her friend thereby possibly causing the relationship to be less "active" in the sense that there will be less communication between the two users. Unfortunately, there is not currently a means for ensuring that relationships between users in a social network continue to be active relationships.

The principles of the present invention provide a means for ensuring that relationships between users in a social network continue to be active relationships by emphasizing a recent communication from a second user 101 (e.g., user of client device 101B) in a first user's 101 (e.g., user of client device 101A) activity stream based on the detected inactivity between the first and second users 101 as discussed further below in connection with FIG. 3.

Figure 3:
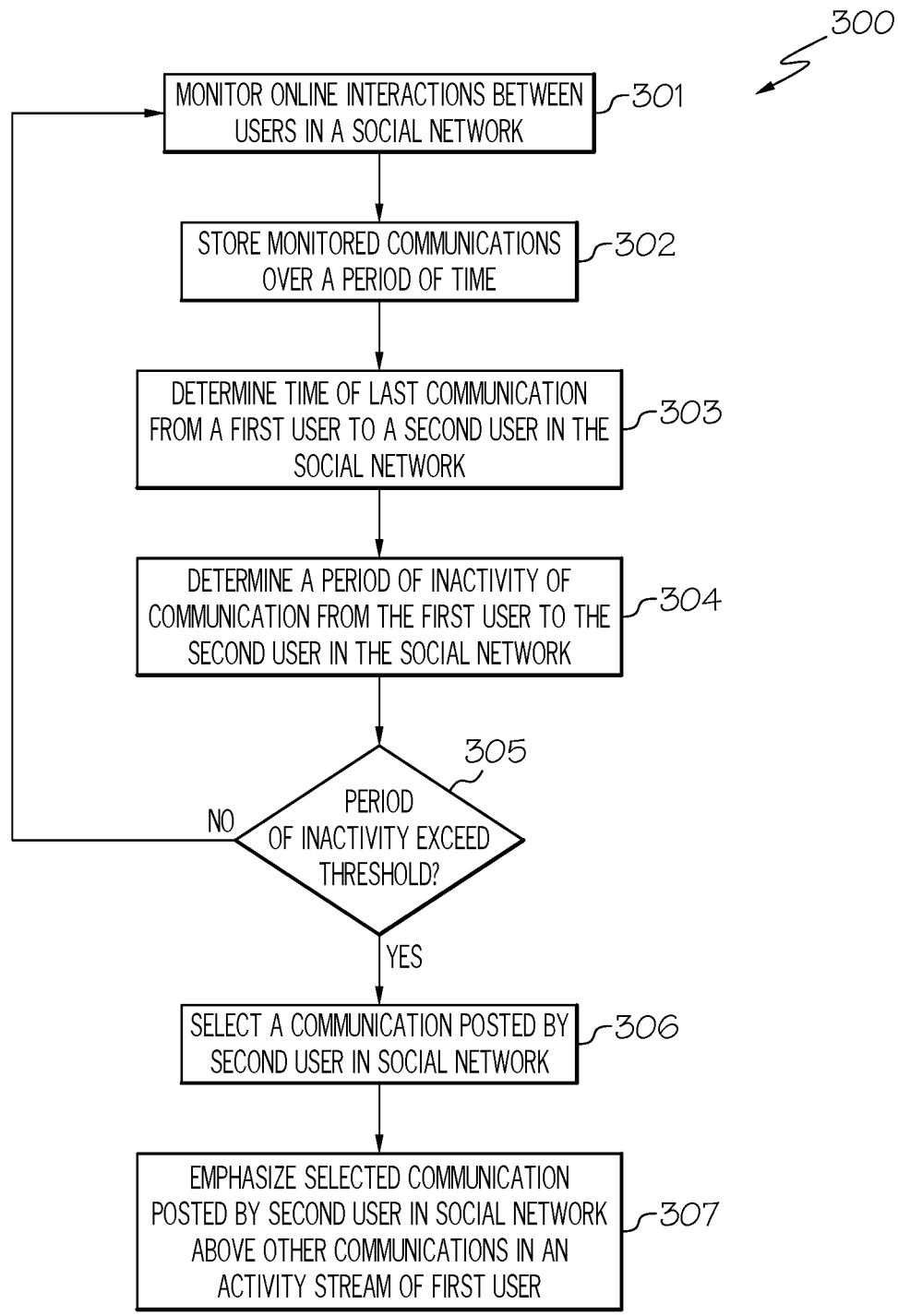
FIG. 3 is a flowchart of a method for ensuring that relationships between users in a social network continue to be active relationships in accordance with an embodiment of the present invention.

FIG. 3 is a flowchart of a method 300 for ensuring that relationships between users in a social network continue to be active relationships in accordance with an embodiment of the present invention.

Referring to FIG. 3, in conjunction with FIGS. 1-2, in step 301, social network management system 104 monitors the online interactions between users 101 in a social network. Online interactions include any communications among users 101 of a social network. As discussed above, "communications," as used herein refer to the exchange of digital messages in any form, including, but not limited to, posts, e-mails, instant messages, etc.

In step 302, social network management system 104 stores the monitored communications, such as in database 105, over a period of time (e.g., last month). For example, communications from a first user 101 (e.g., user of client device 101A) to a second user 101 (e.g., user of client device 101B) in the social network are stored over a period of time.

In step 303, social network management system 104 determines the time of the last communication from a first user 101 (e.g., user of client device 101A) to a second user 101 (e.g., user of client device 101B) in the social network from the monitored online interactions, such as based on the stored communications.

In step 304, social network management system 104 determines a period of inactivity of communication from the first user 101 to the second user 101 in the social network, where the period of inactivity includes a lack of communications directly sent from the first user 101 to the second user 101 and a lack of communications broadcasted on the social network of the second user 101 by the first user 101. In one embodiment, the period of inactivity of communication from the first user 101 to the second user 101 in the social network is based on the determined last time of communication from the first user 101 to the second user 101.

In step 305, a determination is made as to whether the period of inactivity exceeds a threshold. Based on such a threshold, as discussed below, a recent communication from the second user 101 may be emphasized in an activity stream of the first user 101 in order to maintain the relationship between the first and second users 101.

In one embodiment, such a threshold is user-selected. For example, the first user 101 (e.g., user of client device 101A) may select the amount of time of inactivity to trigger emphasizing a recent communication from a second user 101 (e.g., user of client device 101B) in the activity stream of the first user 101. In one embodiment, the user-selected threshold may be different for different users. For example, user 101 may select a first threshold for user A and a second threshold for user B. User 101 may desire different thresholds based on the type of relationship user 101 has with these users. For instance, user 101 may have a lower threshold for a family member versus a former high school friend.

In one embodiment, the threshold is based on a standard deviation from an average of the time transpired between previous communications from the first user 101 to the second user 101 in the social network. For example, the threshold may correspond to two standard deviations beyond the average time transpired between previous communications from the first user 101 to the second user 101 in the social network. In this manner, a user 101 who is more "popular" with the first user 101 (i.e., a user who the first user 101 communicates with often) may have a lower threshold (e.g., threshold of 5 hours) versus a user 101 who is less popular with the first user 101 (e.g., threshold of 1 week).

If the period of inactivity does not exceed the threshold, then social network management system 104 continues to monitor the online interactions between users 101 in a social network in step 301.

If, however, the period of inactivity exceeds the threshold, then, in step 306, social network management system 104 selects a communication posted by the second user 101 in the social network. In one embodiment, the selected communication may be a post, e-mail, instant message, etc. that the second user 101 posted in the social network, where both the first and second users 101 are members of the social network. In one embodiment, the communication is selected based on one or more of the following: popularity, time of last update, randomly selected and content of the selected communication matching content of a prior communication from the first user to the second user within a threshold degree of closeness as discussed further below.

In one embodiment, when there are multiple communications posted by the second user 101 in the social network, social network management system 104 selects the communication that is closest in subject matter within a threshold degree to the last communication from the first user 101 to the second user 101 using natural language processing. For example, if the last communication from the first user 101 to the second user 101 involved the hockey team of the Detroit Red Wings, then social network management system 104 may perform a search for all communications posted by the second user 101 after the time of the last communication from the first user 101 to the second user 101 for any communications related to hockey or the team of the Detroit Red Wings. Such a search may be performed on the communications that were monitored and stored in database 105. For example, if social network management system 104 identified the term of "hockey" in one of the communications posted by the second user 102, then such a communication may be selected as the communication to be emphasized in the first user's 101 activity stream as discussed below.

In one embodiment, when there are multiple communications posted by the second user 101 in the social network, social network management system 104 selects a communication randomly to be emphasized in the first user's 101 activity stream as discussed below.

In one embodiment, when there are multiple communications posted by the second user 101 in the social network, social network management system 104 selects the communication based on popularity to be emphasized in the first user's 101 activity stream as discussed below.

In one embodiment, when there are multiple communications posted by the second user 101 in the social network, social network management system 104 selects the communication that was last posted by the second user 101 to be emphasized in the first user's 101 activity stream as discussed below.

In one embodiment, if there are no communications posted by the second user 101 after the time of the last communication from the first user 101 (e.g., user of client device 101A) to the second user 101 (e.g., user of client device 101B) in the social network, then social network management system 104 prompts the second user 101 to post a message. Such a message would then be emphasized in the first user's 101 activity stream as discussed below.

In step 307, social network management system 104 emphasizes the selected communication posted by the second user 101 (e.g., user of client device 101B) in the social network above other communications in an activity stream (e.g., news feed) of the first user 101 (e.g., user of client device 101A). In this manner, by emphasizing a communication posted by the second user 101 in an activity stream (e.g., news feed) of the first user 101, the relationship between the first and second users 101 may continue to be active. Enabling a relationship between users in a social network to be active in such a manner is a non-conventional way. By using computing technology to determine a time of a last communication from a first user 101 to a second user 101 and selecting a communication posted by the second user 101 to be emphasized in the activity stream of the first user 101, the relationship between the first and second users 102 can be maintained. Enabling relationships between users 101 in a social network to continue to be active improves the utilization of online social networks.

In one embodiment, emphasizing the selected communication involves highlighting the selected communication, bolding text in the selected communication, modifying style of text in the selected communication, placing the selected communication at the top of the activity stream of the first user 101, displaying the selected communication as a separate view, pinning the selected communication, generating an additional notification regarding the selected communication, increasing a time the selected communication is visible to the first user 101 in the activity stream of the first user 101, and/or associating a higher ranking to the selected communication.

In one embodiment, the degree of emphasis of the selected communication over other communications in the activity stream of the first user 101 is based on the period of inactivity of communication from the first user 101 to the second user 101 in the social network. For example, the longer the length of inactivity, the greater the emphasis of the selected communication above other communications in the activity stream of the first user 101. For instance, if the period of inactivity of communication from the first user 101 to the second user 101 in the social network is lengthy, then the selected communication may be highlighted and placed at the top of the activity stream of the first user as opposed to simply having the text in the selected communication bolded.

In one embodiment, the aspect of having a communication from a user 101 emphasized is user-selected. For example, the first user 101 (e.g., user of client device 101A) may be presented with the option as to whether to emphasize communications from those users who the first user 101 has not communicated with over a period of time. In another embodiment, the first user 101 may select which users 101 (e.g., user of client device 101B) whose communications could be emphasized in the activity stream of the first user 101 when the period of inactivity with those users exceeds the threshold discussed above in connection with step 305.

In one embodiment, social network management system 104 informs the first user 101 to respond to the selected communication posted by the second user 101 in a particular manner based on the time of the posting of the selected communication. For example, if the selected communication was posted a few days ago, it may be best to respond privately as opposed to publicly.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for improving utilization of online social networks, the method comprising:
    monitoring online interactions between said users in a social network, wherein said online interactions comprise communications, wherein said communications comprise an exchange of digital messages;
    storing said monitored online interactions over a period of time;
    determining a time of a last communication from a first user to a second user in said social network from said monitored online interactions;
    determining, by a processor of a social network management system, a period of inactivity of communication from said first user to said second user in said social network based on said determined time of said last communication from said first user to said second user, wherein said period of inactivity of communication comprises a lack of communications broadcasted on a social network of said second user by said first user;
    selecting, by said processor of said social network management system, a communication posted by said second user in said social network in response to said period of inactivity of communication from said first user to said second user in said social network exceeding a threshold period of time, wherein said threshold period of time varies based on type of relationship said second user has with said first user, wherein said threshold period of time is based on two standard deviations beyond an average amount of time transpired between previous communications from said first user to said second user in said social network, wherein said selected communication comprises one of the following: a post, an electronic message and an instant message, wherein said communication posted by said second user in said social network is selected based on the following: popularity, time of last update, randomly selected and content of said selected communication matching content of a prior communication from said first user to said second user within a threshold degree of closeness; and
    emphasizing, by said processor of said social network management system, said selected communication posted by said second user above other communications in an activity stream of said first user thereby enabling a relationship between said first and second users to be active which improves utilization of said social network, wherein said selected communication posted by said second user is emphasized over other communications in said activity stream of said first user by performing the following: highlighting said selected communication, bolding text in said selected communication, modifying style of text in said selected communication, placing said selected communication at the top of said activity stream of said first user, displaying said selected communication as a separate view, pinning said selected communication, generating an additional notification regarding said selected communication, increasing a time said selected communication is visible to said first user in said activity stream of said first user, and associating a higher ranking to said selected communication.

2. The method as recited in claim 1, wherein a degree that said selected communication posted by said second user is emphasized over other communications in said activity stream of said first user is based on said determined period of inactivity of communication from said first user to said second user in said social network.

3. The method as recited in claim 1 further comprising:
selecting a communication that is closest in subject matter within a threshold degree to the subject matter of a last communication from said first user to said second user in response to having multiple communications posted by said second user.

4. The method as recited in claim 1 further comprising:
presenting to said first user an option to emphasize communications from those users who said first user has not communicated with over a period of time.

5. The method as recited in claim 1, wherein said selected communication is posted by said second user in said social network in response to prompting said second user to post said selected communication in said social network.

6. The method as recited in claim 2, wherein, in response to a longer length of inactivity, the greater an emphasis of said selected communication above other communications in said activity stream of said first user.

7. The method as recited in claim 1 further comprising:
receiving a selection of which users whose communications are to be emphasized in said activity stream of said first user in response to a period of inactivity with those users exceeding said threshold period of time; and
informing said first user to respond to said selected communication posted by said second user in a particular manner based on a time of posting of said selected communication.

8. A computer program product for improving utilization of online social networks, the computer program product comprising a computer readable storage medium having program code embodied therewith, the program code comprising the programming instructions for:
monitoring online interactions between said users in a social network, wherein said online interactions comprise communications, wherein said communications comprise an exchange of digital messages;
storing said monitored online interactions over a period of time;
determining a time of a last communication from a first user to a second user in said social network from said monitored online interactions;
determining a period of inactivity of communication from said first user to said second user in said social network based on said determined time of said last communication from said first user to said second user, wherein said period of inactivity of communication comprises a lack of communications broadcasted on a social network of said second user by said first user;
selecting a communication posted by said second user in said social network in response to said period of inactivity of communication from said first user to said second user in said social network exceeding a threshold period of time, wherein said threshold period of time varies based on type of relationship said second user has with said first user, wherein said threshold period of time is based on two standard deviations beyond an average amount of time transpired between previous communications from said first user to said second user in said social network, wherein said selected communication comprises one of the following: a post, an electronic message and an instant message, wherein said communication posted by said second user in said social network is selected based on the following: popularity, time of last update, randomly selected and content of said selected communication matching content of a prior communication from said first user to said second user within a threshold degree of closeness; and
emphasizing said selected communication posted by said second user above other communications in an activity stream of said first user thereby enabling a relationship between said first and second users to be active which improves utilization of said social network, wherein said selected communication posted by said second user is emphasized over other communications in said activity stream of said first user by performing the following: highlighting said selected communication, bolding text in said selected communication, modifying style of text in said selected communication, placing said selected communication at the top of said activity stream of said first user, displaying said selected communication as a separate view, pinning said selected communication, generating an additional notification regarding said selected communication, increasing a time said selected communication is visible to said first user in said activity stream of said first user, and associating a higher ranking to said selected communication.

9. The computer program product as recited in claim 8, wherein a degree that said selected communication posted by said second user is emphasized over other communications in said activity stream of said first user is based on said determined period of inactivity of communication from said first user to said second user in said social network.

10. The computer program product as recited in claim 8, wherein the program code further comprises the programming instructions for:
selecting a communication that is closest in subject matter within a threshold degree to the subject matter of a last communication from said first user to said second user in response to having multiple communications posted by said second user.

11. The computer program product as recited in claim 8, wherein the program code further comprises the programming instructions for:
presenting to said first user an option to emphasize communications from those users who said first user has not communicated with over a period of time.

12. The computer program product as recited in claim 8, wherein said selected communication is posted by said second user in said social network in response to prompting said second user to post said selected communication in said social network.

13. The computer program product as recited in claim 9, wherein, in response to a longer length of inactivity, the greater an emphasis of said selected communication above other communications in said activity stream of said first user.

14. The computer program product as recited in claim 8, wherein the program code further comprises the programming instructions for:
receiving a selection of which users whose communications are to be emphasized in said activity stream of said first user in response to a period of inactivity with those users exceeding said threshold period of time; and informing said first user to respond to said selected communication posted by said second user in a particular manner based on a time of posting of said selected communication.

15. A system, comprising:
a memory unit for storing a computer program for improving utilization of online social networks; and
a processor coupled to the memory unit, wherein the processor is configured to execute the program instructions of the computer program comprising:
monitoring online interactions between said users in a social network, wherein said online interactions comprise communications, wherein said communications comprise an exchange of digital messages;
storing said monitored online interactions over a period of time;
determining a time of a last communication from a first user to a second user in said social network from said monitored online interactions;
determining a period of inactivity of communication from said first user to said second user in said social network based on said determined time of said last communication from said first user to said second user, wherein said period of inactivity of communication comprises a lack of communications broadcasted on a social network of said second user by said first user;
selecting a communication posted by said second user in said social network in response to said period of inactivity of communication from said first user to said second user in said social network exceeding a threshold period of time, wherein said threshold period of time varies based on type of relationship said second user has with said first user, wherein said threshold period of time is based on two standard deviations beyond an average amount of time transpired between previous communications from said first user to said second user in said social network, wherein said selected communication comprises one of the following: a post, an electronic message and an instant message, wherein said communication posted by said second user in said social network is selected based on the following: popularity, time of last update, randomly selected and content of said selected communication matching content of a prior communication from said first user to said second user within a threshold degree of closeness; and
emphasizing said selected communication posted by said second user above other communications in an activity stream of said first user thereby enabling a relationship between said first and second users to be active which improves utilization of said social network, wherein said selected communication posted by said second user is emphasized over other communications in said activity stream of said first user by performing the following: highlighting said selected communication, bolding text in said selected communication, modifying style of text in said selected communication, placing said selected communication at the top of said activity stream of said first user, displaying said selected communication as a separate view, pinning said selected communication, generating an additional notification regarding said selected communication, increasing a time said selected communication is visible to said first user in said activity stream of said first user, and associating a higher ranking to said selected communication.

16. The system as recited in claim 15, wherein a degree that said selected communication posted by said second user is emphasized over other communications in said activity stream of said first user is based on said determined period of inactivity of communication from said first user to said second user in said social network.

17. The system as recited in claim 15, wherein the program instructions of the computer program further comprise:
selecting a communication that is closest in subject matter within a threshold degree to the subject matter of a last communication from said first user to said second user in response to having multiple communications posted by said second user.

18. The system as recited in claim 15, wherein the program instructions of the computer program further comprise:
presenting to said first user an option to emphasize communications from those users who said first user has not communicated with over a period of time.

19. The system as recited in claim 15, wherein said selected communication is posted by said second user in said social network in response to prompting said second user to post said selected communication in said social network.

20. The system as recited in claim 16, wherein, in response to a longer length of inactivity, the greater an emphasis of said selected communication above other communications in said activity stream of said first user.

* * * * *